April 3, 1962    W. BEIERBACH ETAL    3,028,199
LOCKING MECHANISM FOR FOLDING SEATS
Filed Oct. 6, 1959    4 Sheets-Sheet 1
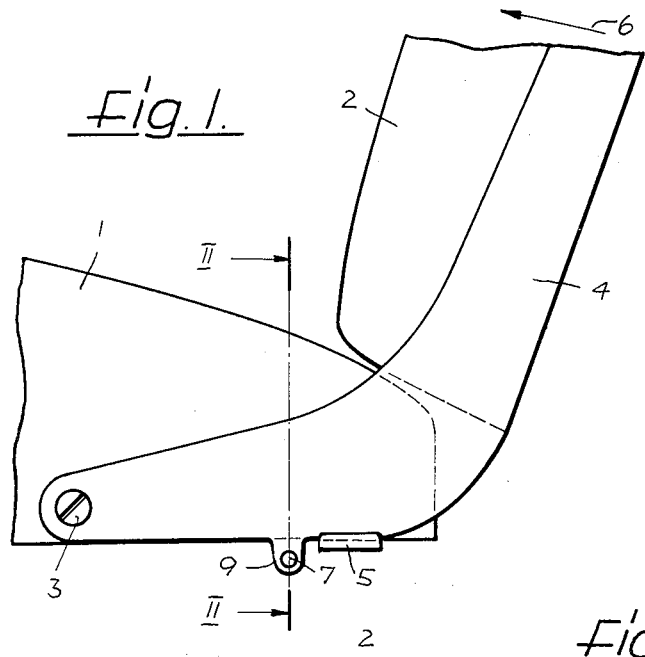
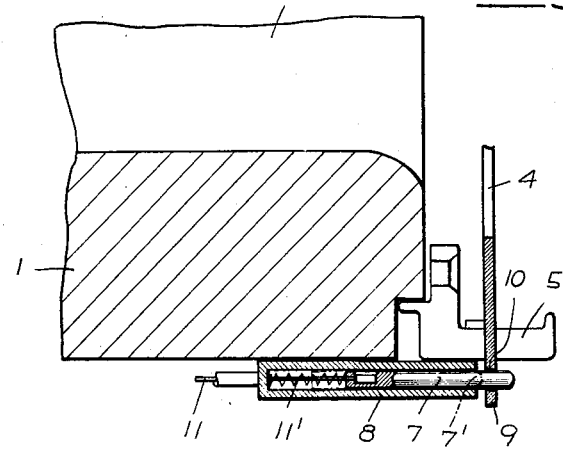
Walter Beierbach +
Ernst Heinl INVENTORS
BY Watson, Cole, Grindle + Watson
ATTORNEYS

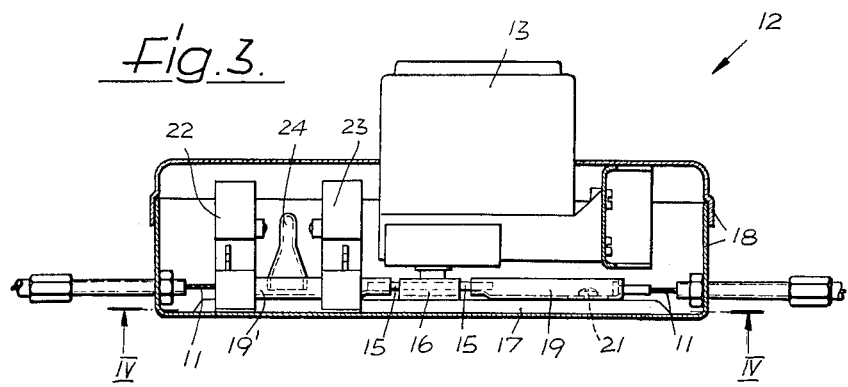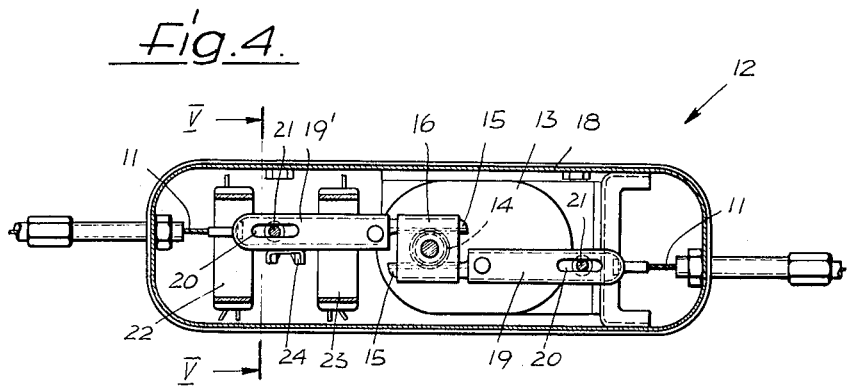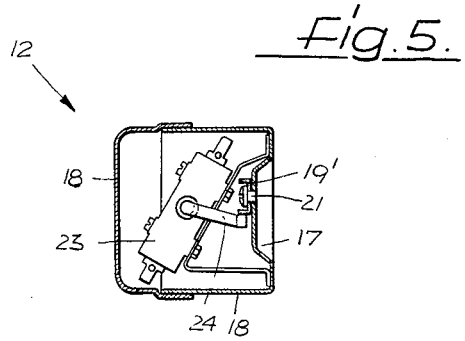

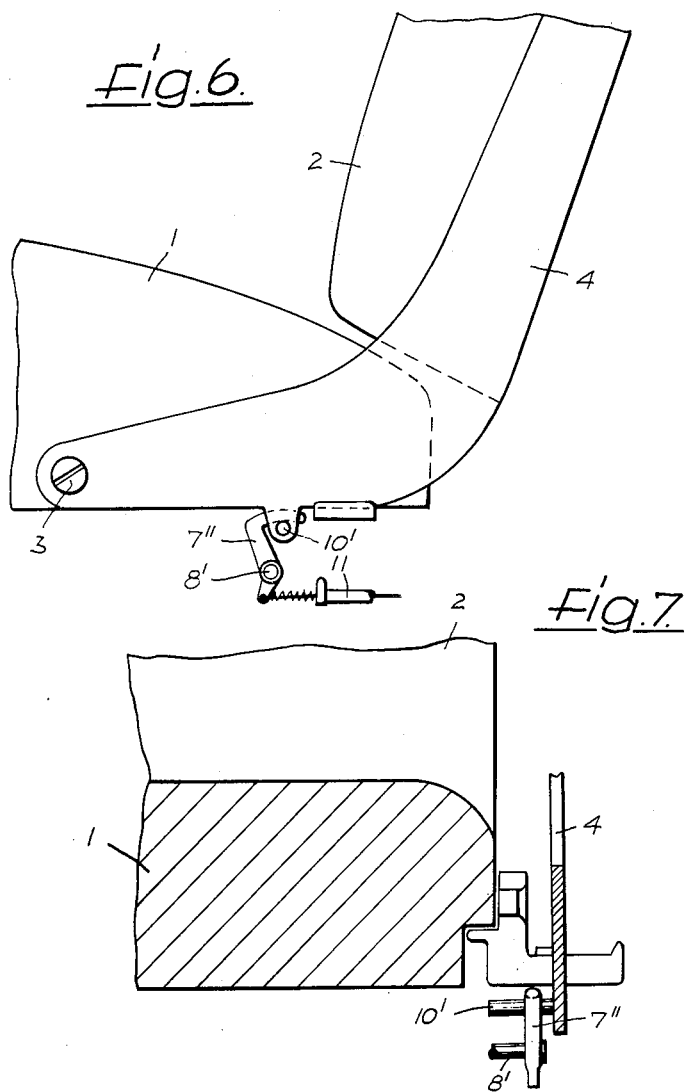

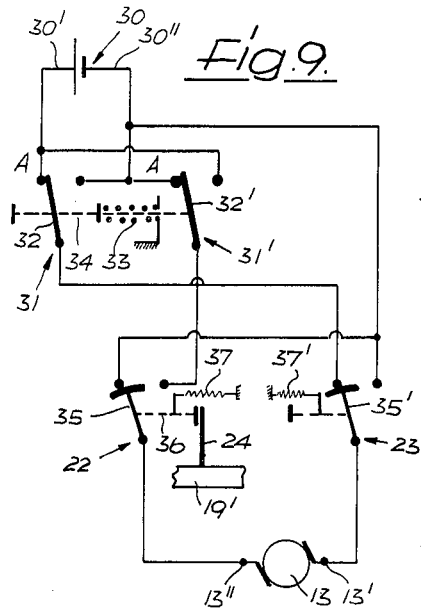
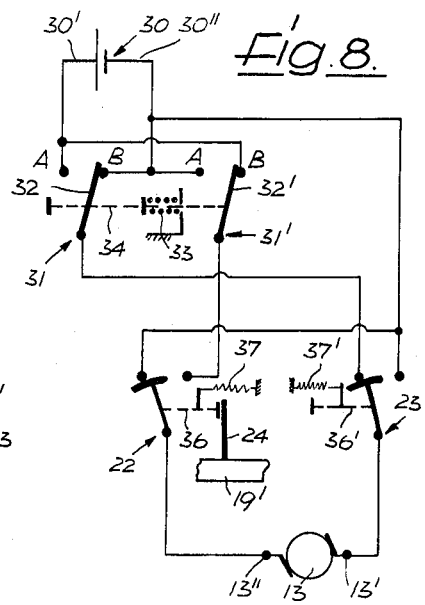
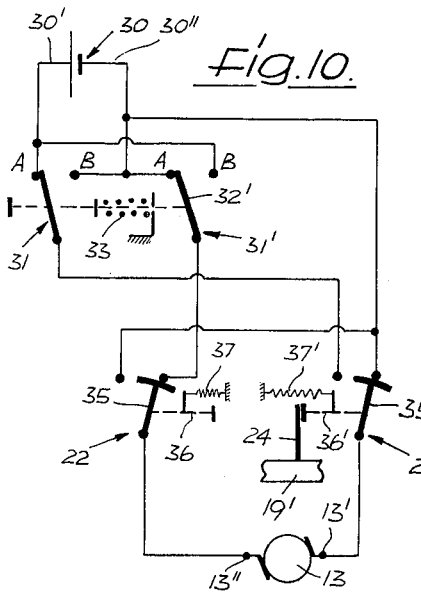
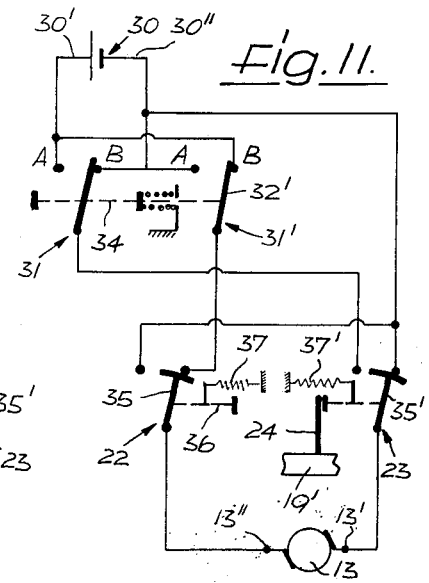
WALTER BEIERBACH &
ERNST HEINL INVENTORS
BY Watson, Cole, Grindle &
Watson
ATTORNEYS United States Patent Office 3,028,199
Patented Apr. 3, 1962

3,028,199
LOCKING MECHANISM FOR FOLDING SEATS
Walter Beierbach, Stuttgart-Weilimdorf, and Ernst Heinl, Stuttgart, Germany, assignors to Stuttgarter-Karosseriewerk Reutter & Co. G.m.b.H., Stuttgart, Wurttemberg, Germany
Filed Oct. 6, 1959, Ser. No. 844,686
Claims priority, application Germany Mar. 12, 1959
6 Claims. (Cl. 297—379)

The present invention relates to seats with folding backs for automobiles and other motor vehicles and more particularly to a locking mechanism for securing the folding back of such a seat in an upright position and for releasing the same.

It is a well known fact that numerous accidents involving serious physical injuries to the occupants of such folding seats occur especially in automobiles of the two-door sedan type when, at a sudden stop of the automobile, an occupant of a rear seat is thrown forwardly against the folding back of a front seat whereby the occupant of such a front seat may, in turn, be thrown against the dashboard or windshield. Instead of forming a secure shield for the occupants of the rear seats and a firm support on which alone they can brace themselves, such folding backs of the front seats are for similar reasons at such times also a source of danger to the occupants of the rear seats. Even apart from accidents, such folding backs of the front seats are at least a cause of annoyance to their occupants who are pushed forwardly at every stop or even a deceleration of the car by rear-seat occupants who habitually hold on to the backs of the front seats. Such push alone may cause the driver to lose control of the car and thus result in a serious accident.

Although there have been prior locking devices for securing the folding backs of such seats in an upright position, these locking devices merely consisted of bell cranks or levers which were either actuated by hand or directly by a door of the car. Such manually or directly operated locking devices have, however, certain disadvantages. The operation of a manual locking device requires a physical effort and may be easily forgotten entirely to be used, while the directly actuated lever means, although automatic, are soon worn out and are also the cause of jamming and wear of the car door. Furthermore, they require the car door to be closed with considerable force in order to operate the locking device.

It is an object of the present invention to provide an improved locking mechanism for securing a folding back of a seat in an upright position and for releasing the same. This mechanism has the advantage over the known mechanical devices that it may be operated by remote control from any desired point of an automobile or other motor vehicle, that it requires practically no physical effort for its operation if actuated manually and that it lends itself particularly to being operated automatically, in which case, if actuated by the opening and closing movements of a door, it will not cause any jamming of the door or require any greater effort for closing the door than that which is required if no seat-back locking device of any kind is provided.

These objects and advantages are attained according to the present invention by providing a locking mechanism which is actuated by means of an electric motor. The use of a motor results in the further advantage that the actuation of the actual locking device is always steady and occurs at a constant force so that the movements of the locking bolts or the like are very gradual but powerful. Since the electric switches for starting the motor may be mounted at any desired point of the automobile, the operation of the locking device may also be controlled from any desired point, for example, in such a manner that, when the door is closed, the locking device is engaged so that the back of the seat is locked, while when the door is opened, the locking device is disengaged so that the back may be tilted.

According to a preferred embodiment of the invention, the electric motor is provided with a driving pinion which is constantly in mesh with at least one rack which, in turn, acts upon the locking device. This results in a very simple and reliable construction which also requires very little space. For limiting the movements of the rack, limit switches may be provided which are connected into the electric circuit of the motor.

These together with other objects, features, and advantages of the present invention will become more apparent from the following detailed description, particularly when read with reference to the accompanying drawings, in which—

FIGURE 1 shows a side view of a part of a seat of an automobile with a folding back which is provided with a locking device according to the invention;

FIGURE 2 shows a cross section taken along line II—II of FIGURE 1;

FIGURE 3 shows a cross section of the driving unit of the locking device according to the invention;

FIGURE 4 shows a cross section taken along line IV—IV of FIGURE 3;

FIGURE 5 shows a cross section taken along line V—V of FIGURE 4;

FIGURES 6 and 7 show views similar to FIGURES 1 and 2, respectively, of a modification of the locking device;

FIGURE 8 shows an electric wiring diagram of a locking mechanism according to FIGURES 1 to 7 and illustrates the course of the current at a time when the door is closed and the folding back of the seat is locked in the upright position;

FIGURE 9 shows the wiring diagram according to FIGURE 8 and illustrates the course of the current at a time when the door is open, but the folding back is still locked;

FIGURE 10 shows the same wiring diagram and the course of the current at a time when the door is open and the folding back is unlocked; while FIGURE 11 shows the same wiring diagram and the course of the current when the door is locked but the folding back is still unlocked.

Referring to the drawings, FIGURES 1, 2, 6, and 7 illustrate a conventional front seat of a two-door sedan with a seat cushion 1 and a folding back 2 which is pivotably mounted about an axis 3 by means of an angular hinge bracket or strap 4. When the folding back 2 is in its normal upright position, this bracket 4 rests on a supporting or stop member 5 which limits the rearward movement of the back. From this position, the folding back 2 may be pivoted forwardly in the direction as shown by the arrow 6, when bracket 4 will disengage from stop member 5.

The locking mechanism according to the invention consists of the actual locking device for securing the folding back 2 in its normal position, a driving or actuating mechanism for operating the locking device, and the electric control means for the driving mechanism. According to one embodiment of the invention as shown in FIGURES 1 and 2, the locking device consists of a locking bolt 7 which is slidable in the axial direction within a cylinder 8 which is secured to the lower side of seat 1. At a point directly opposite to cylinder 8, the angular bracket 4 has a projecting lug 9 which is provided with a bore 10 for receiving locking bolt 7. Each individual seat 1 with a folding back 2 is provided on each side with one of the means described, that is, with a bracket 4, a stop member 5, and a locking bolt 7.

Each locking bolt 7 is connected by a Bowden cable 11 to a driving or actuating unit 12 which may be mounted at any suitable location, preferably underneath seat 1. Cylinder 8 also contains a spring 11' which acts upon locking bolt 7 and normally maintains the same in the outwardly projecting or locking position. The driving unit 12 consists of an electric motor 13 with a driving pinion 14 mounted on its shaft and a pair of gear racks 15 in constant engagement with pinion 14 and at diametrically opposite points thereof. The two racks 15 are enclosed by and guided within a housing 16 which is secured to an inwardly bent part 17 of a housing 18 which also supports the electric motor 13.

Each rack 15 is secured to a connecting member 19 or 19', respectively, which has an elongated slot 20 into which a screw 21 is inserted which is secured to housing 18 and by means of which connecting member 19 or 19' with rack 15 thereon is guided so as to be slidable in a longitudinal direction. Connecting members 19 and 19' carry the two Bowden cables 11 at their outer ends.

Housing 18 further contains a pair of limit switches 22 and 23 which are actuated by a control arm 24 which is secured to connecting member 19'. These limit switches 22 and 23 are adapted to switch off the motor current to stop motor 13 when racks 15 have reached their end positions in one or the other direction. The end position in which limit switch 23 is actuated corresponds to the position 7' of locking bolt 7, as indicated in dotted lines in FIGURE 2, in which this bolt is retracted from bore 10 in lug 9 on bracket 4. The other end position in which limit switch 22 is actuated corresponds to the position of locking bolt 7, in which this bolt engages into bore 10, as shown in FIGURE 2 in full lines.

As will be described in greater detail with respect to the wiring diagrams of the locking mechanism as shown in FIGURES 8 to 11, suitable control switches, for example, a pair of pushbutton switches 31 and 31', may be mounted at any desired point of the automobile, and in parallel connection to the contacts of limit switches 22 and 23 which are to be disconnected by arm 24. These control switches are adapted to start motor 13 in accordance with the required direction of rotation thereof. They may, for example, be mounted in the door frame of the car so as to be operated when the door is opened and closed in a similar manner as the usual door switches for the inside lights of the car, so that when the door is being opened, the folding back of the seat will be automatically unlocked, while when the door is being closed, the folding back will be automatically locked.

In place of a locking bolt 7, any other suitable locking device may be provided, and the means for transmitting the rotation of the motor in one or the other direction to the locking device may also be different from those illustrated in FIGURES 3 to 5. Thus, for example, as shown in FIGURES 6 and 7, the locking bolt 7 according to FIGURES 1 and 2 may be replaced by a hook 7" which is pivotable about a shaft 8' and adapted to engage with a bolt 10' which is secured to hinge bracket 4. Shaft 8' may be secured in a fixed position in a suitable manner, not shown, for example, on the lower side of seat 1. Hook 7" may be connected to the driving unit 2 in a similar manner as shown in FIGURES 1 and 2, for example, by a Bowden cable 11.

As illustrated diagrammatically in FIGURES 8 to 11, motor 13 is driven by a suitable source of current 30, for example, the normal battery of the car. For indicating whether the door of the car is open or closed, a pair of pushbutton switches 31 and 31' are provided, the contact bridges 32 and 32' of which are mechanically connected to each other by a single control rod 34. Rod 34 is acted upon by a spring 33 which, when the door is open, maintains switches 31 and 31' in the position A, as indicated in FIGURES 9 and 10. When the door is closed, some part of the door acts upon rod 34 of switches 31 and 31' in the manner as usual in such door switches and then holds contact bridges 32 and 32' in the position B, as indicated in FIGURES 8 and 11.

The two limit switches 22 and 23 are likewise provided in the form of pushbutton switches and have contact bridges 35 and 35', respectively, which are operated by control rods 36 and 36', respectively, both of which are facing toward control arm 24. Springs 37 and 37' urge rods 36 and 36' in the direction toward control arm 24. Thus, when rod 36 of limit switch 22 is not being actuated by control arm 24, this switch 22 will be in the position as illustrated in FIGURES 10 and 11, while limit switch 23 will be in the position as illustrated in FIGURES 8 and 9.

FIGURE 8 illustrates the condition which prevails when the door is closed and the folding back of the seat is locked. Rod 34 is then pushed inwardly by the door so that switches 31 and 31' are in the position B, while limit switch 22 is in the position as set by control arm 24. In this position, the terminals 13' and 13" of motor 13 are shorted by limit switches 22 and 23 and switch 31 so that the motor is stopped. Also the two terminals of the battery are interrupted.

If the door is then opened, switch 31 will be shifted to the position A shown in FIGURE 9. Limit switches 22 and 23 still remain in the position as shown in FIGURE 8, which means that the folding back is still locked. In this position, one terminal 30' of battery 30 is connected through switches 31 and 23 with one terminal 13' of motor 13, while the other terminal 30" of the battery is connected through switch 22 with the other terminal 13" of motor 13. The motor will then start to run so that control arm 24 will move toward the right. By the action of spring 37, switch 22 is then shifted to its inactive position as shown in FIGURE 10 so that terminal 13" of motor 13 will be connected through switch 22 and switch 31' with the battery terminal 30".

In order to avoid that the supply of current to motor 13 will be interrupted while limit switch 22 is changed over, contact bridge 35 is preferably designed so that the new connection produced by changing over will be made as long as the old connection still remains. Motor 13 will then continue to run until control arm 24 operates limit switch 23 and thereby again shorts the two terminals 13' and 13" of motor 13 through switches 23, 31' and 22. This position with the motor being stopped is illustrated in FIGURE 10.

If the door is then being closed, switches 31 and 31' will again be changed over to the position B, as illustrated in FIGURE 11. Terminal 30" of the battery will then be connected through switch 23 with terminal 13' of the motor, while terminal 30' will be connected through switches 31' and 22 with terminal 13" of the motor. Thus, the motor will start to run in the opposite direction so that control arm 24 will be moved from the position shown in FIGURE 11 toward the left, while switch 23 is pulled by spring 37' into the position shown in FIGURE 8.

In this new position of switch 23, terminal 13' of the motor is still connected with battery terminal 30" through switches 31 and 23. In order to avoid an interruption of the current supply to the motor, contact bridge 35' of switch 23 is also designed so that the old connection will not be broken until the new connection is made. Motor 13 therefore continues to run until, by the operation of switch 22 by control arm 24, the two motor terminals 13' and 13" are again connected by switches 23, 31, and 22, as shown in FIGURE 8, so that the motor stops.

Although our invention has been illustrated and described with reference to the preferred embodiments thereof, we wish to have it understood that it is in no way limited to the details of such embodiment, but is capable of numerous modifications within the scope of the appended claims.

Having thus fully disclosed our invention, what we claim is:

1. A locking mechanism for a folding back portion of a vehicle seat to lock the back portion in upright position comprising at least one lock device connected to the vehicle seat and adapted to project into interlocking engagement with the back portion, an actuating unit mounted near the seat of the vehicle and including a small electric motor as a part of a driving means for the lock device, means connected to the motor and the lock device so that upon actuation of the motor the lock device will be actuated to lock the back portion in the upright position when the vehicle is in motion and to unlock the lock device when the vehicle is not in motion to release the back portion, said connecting means comprising a driving pinion on a shaft of said motor, and a pair of gear racks constantly in mesh with said pinion and extending parallel and in opposite directions to each other and each connected to one of said locking devices.

2. A locking mechanism for a folding back portion of a vehicle seat to lock the back portion in upright position comprising at least one lock device connected to the vehicle seat and adapted to project into interlocking engagement with the back portion, an actuating unit mounted near the seat of the vehicle and including a small electric motor as a part of a driving means for the lock device, means connected to the motor and the lock device so that upon actuation of the motor the lock device will be actuated to lock the back portion in the upright position when the vehicle is in motion and to unlock the lock device when the vehicle is not in motion to release the back portion, said connecting means comprising a driving pinion on a shaft of said motor, and at least one gear rack constantly in mesh with said pinion and connected to said locking device.

3. A locking mechanism for a folding back portion of a vehicle seat to lock the back portion in upright position comprising at least one lock device connected to the vehicle seat and adapted to project into interlocking engagement with the back portion, an actuating unit mounted near the seat of the vehicle and including a small electric motor as a part of a driving means for the lock device, means connected to the motor and the lock device so that upon actuation of the motor the lock device will be actuated to lock the back portion in the upright position when the vehicle is in motion and to unlock the lock device when the vehicle is not in motion to release the back portion, said connecting means comprising a driving pinion on a shaft of said motor, and at least one gear rack constantly in mesh with said pinion and connected to said locking device, said control means comprising a control circuit for said motor and limit switches connected into said motor circuit for limiting the movements of said motor and said gear rack.

4. A locking mechanism for a folding back portion of a vehicle seat to lock the back portion in upright position comprising at least one lock device connected to the vehicle seat and adapted to project into interlocking engagement with the back portion, an actuating unit mounted near the seat of the vehicle and including a small electric motor as a part of a driving means for the lock device, means connected to the motor and the lock device so that upon actuation of the motor the lock device will be actuated to lock the back portion in the upright position when the vehicle is in motion and to unlock the lock device when the vehicle is not in motion to release the back portion, said connecting means comprising a driving pinion on a shaft of said motor, and a pair of gear racks constantly in mesh with said pinion and extending parallel and in opposite directions to each other and each connected to one of said locking devices, and said folding back having a hinge member secured to each side thereof and pivotally connected to said seat, each of said locking devices comprising a locking bolt mounted on said seat and slidable relative to one of said hinge members and adapted to interlock therewith.

5. A locking mechanism for a folding back portion of a vehicle seat to lock the back portion in upright position comprising at least one lock device connected to the vehicle seat and adapted to project into interlocking engagement with the back portion, an actuating unit mounted near the seat of the vehicle and including a small electric motor as a part of a driving means for the lock device, means connected to the motor and the lock device so that upon actuation of the motor the lock device will be actuated to lock the back portion in the upright position when the vehicle is in motion and to unlock the lock device when the vehicle is not in motion to release the back portion, said connecting means comprising a driving pinion on a shaft of said motor, and a pair of gear racks constantly in mesh with said pinion and extending parallel and in opposite directions to each other and each connected to one of said locking devices, said folding back having a hinge member secured to each side thereof and pivotally connected to said seat, each of said locking devices comprising a hook pivotally mounted on said seat so as to be pivoted into interlocking engagement with one of said hinge members.

6. A locking mechanism for a folding back portion of a vehicle seat to lock the back portion in upright position comprising at least one lock device connected to the vehicle seat and adapted to project into interlocking engagement with the back portion, an actuating unit mounted near the seat of the vehicle and including a small electric motor as a part of a driving means for the lock device, means connected to the motor and the lock device so that upon actuation of the motor the lock device will be actuated to lock the back portion in the upright position when the vehicle is in motion and to unlock the lock device when the vehicle is not in motion to release the back portion, said connecting means comprising a driving pinion on a shaft of said motor, and a pair of gear racks constantly in mesh with said pinion and extending parallel and in opposite directions to each other and each connected to one of said locking devices, said connecting means further comprising a Bowden cable connected at one end to said locking device and at the other end to said gear rack.

References Cited in the file of this patent

UNITED STATES PATENTS

| | | |
|---|---|---|
| 2,559,548 | Seigneur | July 3, 1951 |
| 2,752,988 | Marvin | July 3, 1956 |
| 2,815,796 | Lobanoff | Dec. 10, 1957 |
| 2,829,002 | Leavengood et al. | Apr. 1, 1958 |
| 2,864,431 | Eaton | Dec. 16, 1958 |